Patented Oct. 5, 1948

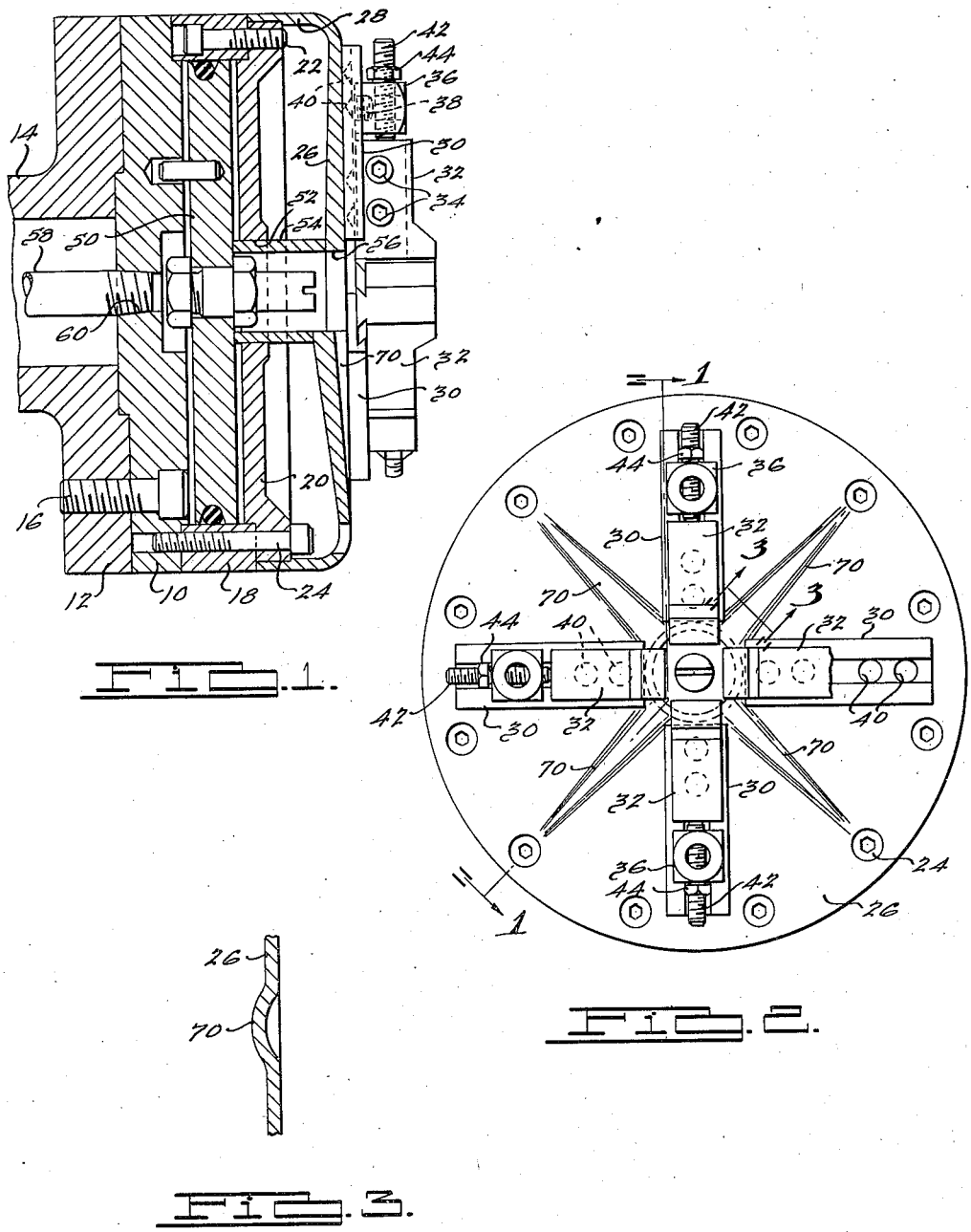

2,450,800

UNITED STATES PATENT OFFICE 2,450,800

DIAPHRAGM CHUCK

George Hohwart and Ernest F. Hohwart, Detroit, Mich., assignors to N. A. Woodworth Company, Ferndale, Mich., a corporation of Michigan Application July 13, 1946, Serial No. 683,459

5 Claims. (Cl. 279—46)

This invention relates to diaphragm chucks and has for its principal object the provision of a chuck of this type including a novel feature of construction which increases the field of adaptability of a chuck of this type.

Objects of the invention include the provision of a diaphragm chuck, the diaphragm of which is so constructed and arranged as to permit a relatively greater flexing of the diaphragm than in conventionally constructed diaphragm chucks of the same diameter without stressing the material of the diaphragm beyond its elastic limits; the provision of a diaphragm chuck in which the diaphragm is so constructed as to permit the chuck to receive workpieces having a greater tolerance in the dimensions of the surface to be engaged by the jaws of the chuck than in prior diaphragm chucks of the same size; the provision of a diaphragm chuck including a diaphragm which is corrugated in such a manner as to render the central portion of the diaphragm more flexible, thereby allowing it to be sprung or flexed to a greater extent than the diaphragms in conventional diaphragm chucks, and thereby to permit the chuck to receive workpieces having a greater tolerance of the chucking surface thereof than has heretofore been possible; and the provision of a diaphragm chuck including a diaphragm having jaws secured to the axially outer face thereof and corrugations formed in the diaphragm intermediate the jaws to enhance the flexibility of the diaphragm.

The above being among the objects of the present invention, the same consists in certain new and novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a sectional view taken longitudinally through a diaphragm chuck incorporating the present invention, as on the line 1—1 of Fig. 2, and showing the same mounted upon the outer end of the machine tool spindle;

Fig. 2 is a face view of the diaphragm chuck shown in Fig. 2; and

Fig. 3 is an enlarged, transverse sectional view taken on the line 3—3 of Fig. 2 and illustrating a corrugation formed in the diaphragm of the chuck.

Diaphragm chucks conventionally include a metal diaphragm in the form of a flat and plain bottomed cup or a flat, plain disk arranged with the general plane thereof perpendicular to the axis of rotation of the chuck and carrying work-engaging jaws on the axially outer face thereof. Means are provided for springing the central portion of the diaphragm axially out of its normally free position so as to effect either an expansion or contraction of the jaws, depending upon whether the jaws are adapted for internal or external chucking operations, to permit the removal or introduction of the workpiece from or to the jaws, upon which the pressure applied to the diaphragm is relieved thereby to permit the jaws to grip the piece of work as the diaphragm returns toward its normally free position.

In order to grip a piece of work with sufficient rigidity and secureness to permit a machining operation to be performed thereon, the diaphragm must be made sufficiently heavy or thick to withstand the stresses set up in the machining operation without yielding of the jaws on the workpiece gripped thereby. As a result, the amount which the diaphragm may be axially sprung without permanent distortion thereof is relatively small, and in small and medium size chucks in particular the movement of the jaws away from work-engaging position has heretofore required that the surface of the piece of work which the jaws are to engage be held within a maximum tolerance of approximately ten one-thousandths of an inch. If the chucking surface of the work is one which may be a rough machined surface, nevertheless, under such circumstances, the diameter of such chucking surface must be held within a maximum tolerance of ten one-thousandths of an inch in order to enable such workpieces to be consistently gripped in the chuck. As is well understood by those skilled in the art, the closeness of the tolerance on a machine surface has a direct bearing on the cost of machining such surface so that under the circumstances above mentioned, if the tolerance of the surface of the workpiece which is to be gripped by the jaws in the chuck can be increased, the machining cost of the work can be correspondingly decreased. It is therefore desirable to provide a diaphragm construction for a diaphragm chuck which will enable the diaphragm to be sprung out of its relatively free position to a greater extent than the diaphragms heretofore employed and without causing permanent deformation thereof by stressing the material of the diaphragm beyond its elastic limits.

The above described desirable attribute is obtained in accordance with the present invention by corrugating the diaphragm so as to increase the flexibility thereof at its center in a direction normal to its plane of thickness, the amount which the diaphragm may thus be sprung being capable of being increased as much as 100%, as compared to a plain diaphragm, without permanently deforming the diaphragm. This means that a corresponding increase in the movement of the chuck jaws is obtainable, and a corresponding increase in the permissible tolerance of the chucking surface of the work is likewise possible, with all the attendant advantages.

It will, of course, be understood that the present invention may be adapted to any suitable design and/or construction of diaphragm chuck, that shown in the drawing being shown merely by way of illustration. In this connection, it may be noted that the particular form of diaphragm shown in the drawing is disclosed and claimed in United States Letters Patent No. 2,403,599, issued July 9, 1946. The particular jaw structure shown on the diaphragm in the accompanying drawing forms the subject matter of our copending application for Letters Patent of the United States for improvements in Diaphragm chuck filed July 13, 1946, and serially Numbered 683,457. The fluid pressure operated means and associated mechanism shown in the accompanying drawing for effecting operation of the diaphragm is shown and claimed in our copending application for Letters Patent of the United States for improvements in Diaphragm chuck, filed July 13, 1946, and serially numbered 683,458.

In the particular diaphragm chuck shown in the accompanying drawing by way of illustration, there is a disk-like mounting plate or member 10 piloted upon the outer flanged end 12 of the machine tool spindle 14 and secured thereto by means of screws 16. The axially forward face of the mounting member 10 is shouldered and receives concentrically thereon a ring 18. A shouldered backing-plate 20 is piloted in the bore of the ring 18 and is secured to the axially outer face thereof by means of screws 22. Screws 24 projecting rearwardly and in parallel relation with respect to the axis of the chuck through the mounting plate 20 and ring 18, thread into the mounting plate 10 to secure all of these parts together in unitary relationship. The particular diaphragm shown is of generally cup-shaped conformation including a disk-like central portion 26 and a rearwardly flanged marginal portion 28 which fits over the periphery of the backing plate 20, and while it may be suitably fixed thereto by any suitable means it is preferably secured thereto by brazing or welding as disclosed and claimed in our copending application for Letters Patent of the United States for improvements in Diaphragm chuck, filed July 13, 1946, and serially numbered 683,456.

The chuck may, of course, be equipped with any desired number of jaws or jaw devices, four of the same being shown in the drawing by way of illustration, and these being equally angularly spaced with respect to each other about the axis of the chuck. Each jaw device or assembly comprises a radially extending jaw base 30 suitably fixed to the axially outer face of the central portion 26 of the diaphragm, and each jaw base 30 is provided with a radially extending dovetail groove in its axially outer face. Each jaw base 30 receives a jaw 32 provided with a dovetail rib or bead on its axially inner face which is received in the groove of the base 30 in interfitting relation with respect thereto. The axially inner edge of each jaw 32 is laterally flexible and may be spread by means of setscrews 34 so as to bind in the dovetail groove of the base 30. Radially outwardly of each jaw 32, a backing-up member 36 is located and which is provided with a dovetail rib or bead on its axially inner face interfitting the groove of the jaw base 30. Each backing-up member 36 is secured in place on the jaw base 30 by means of a setscrew 38, the inner end of which is received in one of four depressions 40 provided in the bottom of the groove in the jaw base 30. An adjusting screw 42 threaded radially through each backing-up member 36 extends into contact with the radially outer face of the corresponding jaw 32 and is locked in adjusted position by means of a locknut 44. The adjusting screw 42 extends in blocking relation with respect to the outer end of the setscrew 38 so as to prevent setscrew 38 from becoming disengaged from its corresponding depression 40, thus providing a positive mechanical lock for the setscrew 40. As previously mentioned, this jaw mechanism forms no part of the present invention, but comprises the subject matter of our copending application for Letters Patent of the United States for improvements in Diaphragm chuck, filed July 13, 1946, and serially numbered 683,457.

The diaphragm 26 is operated to open the jaws 32 to receive a piece of work therein in the following manner. The ring 18, which spaces the mounting plate 10 and backing plate 20, interiorly forms a cylinder in which a piston 50 is reciprocally received. The backing plate 20 is imperforate except for a central opening 52 in which a sleeve member 54 is axially slidably received in concentric relation with respect to the axis of the chuck. The sleeve 54 is of such length that its rear end abuts the forward face of the piston 50 and its forward end abuts the rear face of the diaphragm 26. The diaphragm 26 is preferably provided with a central aperture 56 of the same size as the bore of the sleeve 54 so as to permit work to be projected to within the sleeve 54 when necessary for proper chucking operations thereon.

The particular chuck shown by way of illustration being adapted for externally chucking a piece of work, then fluid under pressure is introduced between the rear face of the piston 50 and the forward face of the mounting member 10 to effect movement of the piston 50 and, through the sleeve 54, a corresponding movement of the central portion of the diaphragm 26. It will, of course, be appreciated that where the chuck is adapted for internal chucking operations, then a different form of means, such as shown and described in our copending applications above identified, may be employed to effect axially rearward movement of the central portion of the diaphragm 26 with the piston 50. In the latter case it will, of course, be appreciated that fluid under pressure will have to be introduced between the axially outer face of the piston 50 and the rear face of the backing member 20, all of which may be accomplished in the manner disclosed in our copending applications above identified. In the particular case shown, fluid under pressure is introduced behind the piston 50 through a tube or pipe 58 threaded into an opening 60 in the mounting member 10 and extending to a suitable source of fluid under pressure. Thus, when fluid under pressure is introduced through the pipe 58 it acts on the axially inner face of the piston 50 and urges the same axially outwardly, and the force of this pressure is transmitted through the sleeve 54 to the central portion of the diaphragm, causing the central portion of the diaphragm to be flexed outwardly and causing the jaws 32 to be spread so as to permit the removal of a piece of work from between them, or the introduction of a piece of work to between them.

Now as previously explained, it has been the conventional practice to form a diaphragm such as the diaphragm 26 or its equivalent as a substantially flat and plain disk, and because of this form, the amount which the central portion of the diaphragm may be sprung axially in order to move the jaws to release or receive a piece of work without exceeding the elastic limit of the material from which the diaphragm is formed and therefore without permanent distortion of the diaphragm, has been relatively limited, requiring the surfaces of the workpiece which are to be engaged by the jaws of the chuck to be held within relatively close limits. In accordance with the present invention, in order to increase this flexibility of the diaphragm so as to permit its central portion to be sprung to a greater extent and therefore permit greater relative movement between the jaws of the chuck to release or receive a piece of work without permanently distorting the diaphragm, the diaphragm 26 is corrugated in such a manner as to increase its flexibility as compared to a conventional diaphragm of the same diameter and thickness. While such corrugations may be provided in a number of different arrangements and placement, and the number of corrugations employed varied to a considerably great extent, in the drawing, by way of illustration, one corrugation 70 is centrally provided between each pair of chuck jaw assemblies, and extends radially with respect to the axis of the chuck. The particular corrugations 70 shown are of maximum depth at their axially inner ends, namely, at the bore 56, and fade out substantially at the junction of the central portions 26 and marginal portions 28 of the diaphragm. In other words, the corrugations 70 are of greatest extent at the central portion of the diaphragm where the greatest amount of axial movement occurs, and their depth or extent varies substantially in accordance with the corresponding flexibility required at different radial positions of the diaphragm. Such arrangement will ordinarily be found most desirable and constitutes a more limited phase of the present invention. For the purpose of facilitating the design and machining of the jaw bases 30 and their securement to the diaphragm 26, the corrugations 70 preferably do not extend into the area of the diaphragm to which the jaw bases 30 are secured, but, of course, may where this is found to be either necessary or desirable to obtain the desired flexibility of the diaphragm.

It will be appreciated that the provision of the corrugations 70, or their equivalent, permit a greater flexing of the central portion of the diaphragm without exceeding the elastic limit of the material from which it is constructed than is the case where such corrugations are omitted, and that, therefore, they permit a greater flexing of the diaphragm than is possible with conventional flat diaphragm without permanent deformation thereof, resulting in greater movement of the jaws and consequently permitting workpieces having greater tolerances to be successfully chucked therein.

Having thus described our invention, what we claim by Letters Patent is:

1. In a diaphragm chuck of the class wherein there is a mounting member and a plurality of work receiving jaw devices, the combination with said mounting member and jaw devices of a diaphragm interposed therebetween, said diaphragm having radially directed corrugations therein between said jaw devices increasing the flexibility thereof axially of said chuck.

2. In a diaphragm chuck, in combination, a diaphragm arranged with the general plane of thickness thereof perpendicular to the axis of rotation of said chuck, said diaphragm having radially directed corrugations therein serving to increase the flexibility of said diaphragm axially of said chuck, and jaw devices fixed to the outer face of said diaphragm each between an adjacent pair of said corrugations.

3. In a diaphragm chuck, in combination, a diaphragm arranged with the general plane of thickness thereof perpendicular to the axis or rotation of said chuck, angularly spaced jaw members fixed to the axially outer face of said diaphragm, said diaphragm having a central aperture therein and radially directed corrugations extending radially from said aperture between said jaw members, said corrugations being of greatest depth at said aperture and decreasing in depth radially outwardly therefrom.

4. In a diaphragm chuck, in combination, a diaphragm arranged in a general plane of thickness perpendicular to the axis of said chuck and rigidly secured with respect to the remainder of said chuck at its periphery, and a plurality of jaw devices secured to the axially outer face of said diaphragm, said diaphragm being radially corrugated with a corrugation extending radially between each adjacent pair of jaw devices.

5. In a diaphragm chuck, in combination, a diaphragm arranged in a general plane of thickness perpendicular to the axis of said chuck and provided with a central, axial opening therein, a plurality of jaw devices mounted on the axially outer face of said diaphragm in approximately equally angularly spaced relation with respect to each other about the axis of said chuck, said diaphragm having a radially directed corrugation therein between each adjacent pair of said jaw devices and extending from said central opening radially outwardly therefrom, whereby to increase the flexibility of said diaphragm in an axial direction at its center.

GEORGE HOHWART.
ERNEST F. HOHWART.

REFERENCES CITED

The following references are of record in the file of this patent:

UNITED STATES PATENTS

| Number | Name | Date |
| --- | --- | --- |
| 1,341,015 | Louie | May 25, 1920 |
| 1,426,541 | Bisset | Aug. 22, 1922 |
| 1,734,624 | Harrison | Nov. 5, 1929 |
| 1,827,415 | Bidwell | Oct. 13, 1931 |
| 1,934,411 | Dahlman | Nov. 7, 1933 |
| 1,956,272 | Church | Apr. 24, 1934 |
| 1,956,318 | Draper | Apr. 24, 1934 |
| 2,000,341 | Larsh | May 7, 1935 |
| 2,331,111 | Dunn | Oct. 5, 1943 |
| 2,380,681 | Wolfram | July 31, 1945 |